June 30, 1942.    E. KRAMAR    2,288,196
RADIO BEACON SYSTEM
Filed Nov. 18, 1938 a)

b)

c)

INVENTOR.
ERNST KRAMAR
BY
ATTORNEY

Patented June 30, 1942

2,288,196

UNITED STATES PATENT OFFICE 2,288,196

RADIO BEACON SYSTEM

Ernst Kramar, Berlin, Germany, assignor to C. Lorenz Aktiengesellschaft, Berlin-Tempelhof, Germany, a company Application November 18, 1938, Serial No. 241,155
In Germany November 18, 1937

2 Claims. (Cl. 250—11)

The invention relates to methods of determining positions, such as positions of aircraft, by means of high frequency radiations. More particularly the invention is concerned with those methods of this kind in which a radio transmitter is arranged to produce directional radiation diagrams by a keying operation effected in the rhythm of complementary signals and in such manner that the signals of one kind, such as dots or the Morse signal "a," are produced in the intervals between the signals of the other kind, such as dashes or the Morse signal "n." In the line of equal field intensity of the two radiation diagrams or patterns these signals complete each other to form an uninterrupted signal spoken of as continuous dash line. On the receiving side this continuous dash line is reproduced by a telephone in order to be followed as a course line for navigation purposes.

Figure 1:
Figure 2:
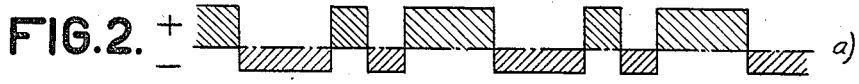
Figure 2:
Figure 2A:
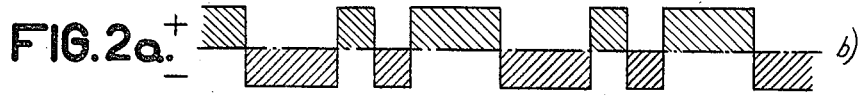
Figure 2A:
Figure 2B:
Figure 2B:
Figure 3:
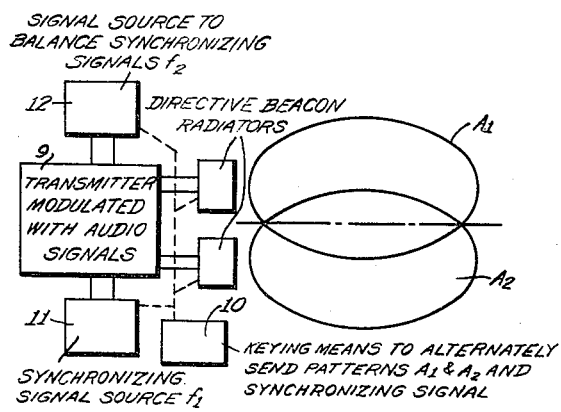
Figure 4:
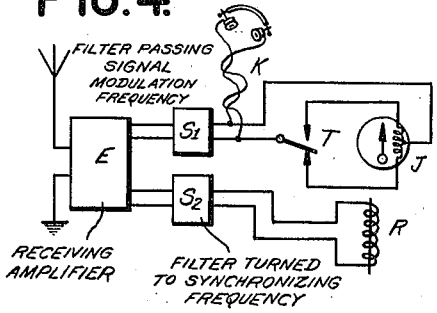
Figure 5:
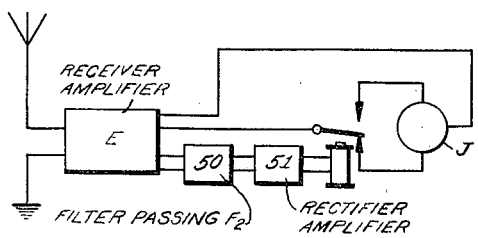
Figure 6:
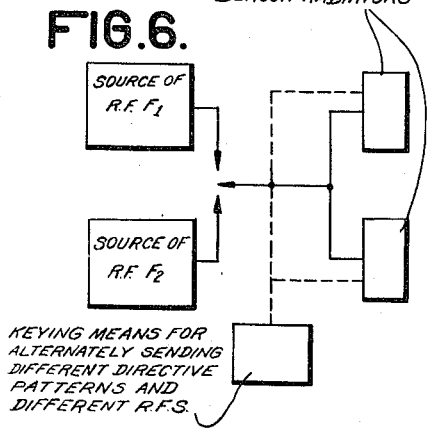

The invention consists in certain features of novelty which will appear from the following description and be particularly pointed out in the appended claims, reference being had to the accompanying drawing, in which Figs. 1, 2, 2a, 2b are graphical representations which by way of example serve to explain the idea of the invention, Fig. 3 is a diagrammatic representation of a transmitter which serves to explain the operation of one embodiment of the invention, Fig. 4 is a schematic view of this embodiment, and Figs. 5 and 6 show a modified receiver and transmitter circuit, respectively.

Methods of the kind here referred to require that in addition to the aural indication, effected by the telephone, an optical indication be provided to make the course line and deviations therefrom visible. In order to perform this, methods have been devised all of which however have certain disadvantages. For instances, a known method is such that the two different antenna diagrams are not produced in the rhythm of complementary signals but are modulated with different tone frequencies. The indication is effected by means of frequency-sensitive indicators adapted to respond to the amplitude difference of the two different modulating frequencies. The disadvantage of this method is that only a visual indication is feasible, no accurate aural comparison of the field intensities being possible. It is however desirable, for instance on aeroplanes, that in addition to the visual indication an aural comparison be possible, since the pilot has sometimes to observe a plurality of instruments. He will then be able to change from the visual to the aural indication.

Another method provides for a simultaneous aural and visual indication in using the induction impulses produced in a transformer by the flanks of the keying signals and rendered effective in a special instrument which in the vicinity of the zero position of its pointer is very sensitive while being of less sensitivity in the outer positions of the pointer. This arrangement however has the drawback that the pointer of the indicating instrument is jerking in the rhythm of the induction impulses produced in the transformer whereby the parts of the scale are badly readable, the so-called jerky indication being obtained in this way. Apart from this the method based on the application of induction impulses involves that the keying rhythm and also the kind of the keying signals cannot be chosen at will, only definite kinds of signals, such as dots and dashes, ensuring a perfect operation.

In order to avoid the aforesaid disadvantages a method has been proposed which likewise allows aural and visual indication to be effected both at the same time. This method is in the nature of a combination of the known keying method and the modulation method herebefore referred to. The different directional diagrams are here keyed simultaneously and in the rhythm of complementary signals and are in addition modulated with different frequencies. In the receiving apparatus such keying signals and the modulating frequencies are separated from each other. One kind thereof is in known manner made to produce an aural indication while the other kind is by means of frequency-sensitive indicators utilized for obtaining a visual indication. This method however is disadvantageous inasmuch as the aural and visual indications are not forcibly interrelated, being differently controlled by the transmitter and separately rendered effective in the receiver. It may therefore occur that the keying signals observed by aural comparison precisely indicate the course line whereas the modulation signals of the visual indication have through outer influences altered their amplitudes, the indicating instrument thus showing a course different from that indicated by the telephone.

The invention described hereafter discloses a novel method of producing simultaneous aural and visual indications, namely a method which is free from the aforesaid disadvantages and independent of the kind and frequency of the keying signals. In addition the aural and visual indications are compulsorily interrelated, misleading indications otherwise possible being avoided in this way.

In accordance with the invention it is proposed to separate on the receiving side the diverse keying signals from each other by a switching operation and to compare them with each other by means of an optical indicating instrument. For instance, such separation of the keying signals may be effected by switching the indicating instrument in the rhythm of the keying signals. In this way the antenna keying, that is, the operation effected on the transmitting side, is synchronized with the switching-over to which on the receiving side the indicating instrument is subjected. This synchronism may be effected on the receiving side and may be produced here by special synchronizing signals arriving from the transmitter.

Appropriately, the novel method should be such as to control this switching operation from the transmitter. In order to achieve this the invention proposes to distinguish between the keying signals of the two kinds by the use of additional characteristics. For instance, a special synchronizing signal may be allotted to the keying signals of one kind while the keying signal of the other kind is emitted in the usual manner, that is, without any additional signal. The arrangement will be particularly simple if on the transmitting side one of the alternately produced directional diagrams is modulated with an additional auxiliary frequency, namely a frequency which is influenced by the switching operations effected in the rhythm of the keying signals of this directional diagram. On the receiving side such auxiliary frequency is utilized for controlling the switching operation. The arrangement may however be such that the switching of the indicating instrument is not influenced by a modulating frequency but is acted upon by a difference of the carrier frequencies, that is to say, one of the directional diagrams is based on a carrier frequency different from the carrier frequency of the other directional diagram. In such cases special circuit arrangements are provided on the receiving side, such for example as resonance or filter circuits adapted to respond to the diverse carrier frequencies and thereby to effect the desired switching operation.

If the synchronizing of the switching operation on the transmitting side with that on the receiving side is desired not to be effected by a synchronizing signal from the transmitter but by provisions on the receiving side, then in accordance with the self-synchronization well known in connection with wireless intercommunication systems tuning forks, quartz generators or similar means are employed in order to produce an absolutely constant frequency.

In order to obtain from the keying signals a visual indication the diverse keying signals, separated from each other by the said switching-over, are compared with each other by an indicating instrument. The course line is then being followed if the kinds of signals are equal to one another. The arrangement may be such that separate indicating instruments, one to each kind of signals, are alternately joined to the output circuit of the receiving apparatus through a switching device synchronizing with the keying operation effected in the transmitter. One of these instruments will then indicate the intensity of the keying signals of one kind while the other instrument is indicating the keying signals of the other kind. If the two signals are of the same amplitude then also the pointer deflections of the two instruments are the same. In such case the course line is being followed. When however the deflection of one pointer is in preponderance of that of the other pointer a deviation from the course line either to the left or the right hand side has taken place.

In another embodiment of the invention both keying signals are made to influence the pointer of a single instrument in accordance with a differential method. In order to obtain this the keying signals of the two kinds are by a suitable switching device caused to act on the indicating instrument in opposition to each other. Alternatively, in order to effect such differential method the directional properties of the indicating instrument may by other means be alternately reversed in the keying rhythm, for example by reversing the polarity of the field direction. The operation of this arrangement will now be explained with reference to Figs. 1 and 2.

In Fig. 1 the keying rhythm of the Morse signals "a" and "n" is plotted diagrammatically. The amplitude of the signal "a" is here supposed to be double the size of signal "n." As shown in Fig. 1 the arriving signals are all of the same direction, namely the direction indicated by the sign $+$. In accordance with the invention these signals are caused to influence the indicating instrument in alternately opposite directions. This is illustrated in Figs. 2, 2a and 2b. Signal "a" is here of the direction $+$ while the direction of the opposing signal "n" is designated by the sign $-$. In Fig. 2 the positive direction of the signal "a" is shown to be in preponderance of the negative direction of signal "n." The pointer of the indicating instrument J is shown to be hereby deflected to the left hand side, for instance. In the drawing this deflection is represented as upwardly directed. In Fig. 2a the two opposing signals are equal to each other. Therefore the pointer of instrument J remains in its mid-position, as shown, this being the case of the so-called continuous dash line. In Fig. 2b the negative direction of the signal "n" is preponderating. The pointer of instrument J is hence in the opposite position to that represented in Fig. 2a.

The novel method thus allows of producing in a simple manner a visual indication of the course line independently of the kind and frequency of the keying signals. It is merely necessary so to choose the inertia and attenuation of the instrument that it shall not follow the individual signals but shall indicate the virtual value of the pulsating direct current originated by the keying signals. If this requirement is fulfilled then an exact reading will be possible and the scale may be calibrated in angle degrees which indicate the deviation from the course line.

The embodiments to which Figs. 3 and 4 refer comprise a system showing a keyed instrument and an indicating instrument arranged to be switched over in the rhythm of the keying signals. This switching is controlled from the transmitter by synchronizing signals from 11 which are alternately transmitted with one of the signals, as stated before. The arrangement will be simplest if one of the antenna fields is modulated with an additional auxiliary frequency $f_1$ keyed with the keying signal allotted to this antenna field as indicated by 10 and the dash line connections. In Fig. 3 two alternately keyed directional diagrams A1, A2 are represented which are both modulated with the same audio frequency, 1150 cycles per second for instance in the transmitter 9. Both antenna diagrams are alternately rendered effective in the rhythm of complementary signals by keying means 10. Antenna field A2 is modulated with an additional synchronizing frequency of say 4000 cycles from source 11. This auxiliary frequency is likewise keyed in the rhythm of the keying signal of this antenna field and causes on the receiving side the indicating instrument to be switched over.

The synchronizing frequency is preferably chosen to be without the range of audibility in order not to influence the timbre of the telephonic reproduction.

The additional synchronizing frequency of antenna diagram A2 may under certain circumstances disturb the state of equilibrium of the transmitting arrangement in such manner that the antenna A2 will be of less efficiency in the receiver than diagram A1, whereby the course line would be displaced in relation to the plane of symmetry. This drawback may be overcome by modulating also the second antenna field A1 with an auxiliary frequency f2 from a source 12. This frequency however should be different from the synchronizing frequency of 4000 cycles and not be rendered effective in the receiving apparatus. It merely serves to secure the state of equilibrium. This state may however be established in any other suitable manner. For instance, one antenna field may be slightly amplified over the other.

The arrangement shown in Fig. 4 is an example of a receiving arrangement adapted for effecting the novel method of amplitude comparison. The transmitter radiation is received in a receiver E in which the arriving oscillations are amplified at high frequency, are rectified and are then amplified at low frequency. In the receiver output circuit the diverse modulating frequencies, that is, the signal modulating frequency of 1150 cycles and the synchronizing frequency of 4000 cycles, are separated from each other. For this purpose, filter chains S1, S2 are provided. S1 is tuned to the frequency 1150 cycles while S2 is tuned to the synchronizing frequency of 4000 cycles. Connected to the output circuit of filter chain S1 is a pair of headphones K and an indicating instrument J which is tapped in the middle and whose polarities are reversible by means of a changeover switch T. Switch T is actuated by a relay winding R which is connected to the output circuit of filter chain S2 and therefore only responds to the synchronizing frequency of 4000 cycles. Instead of an instrument J with center tapping an instrument of normal type may be employed, switch T in this case being arranged to change from one terminal thereof to the other.

In a modified system, namely the case in which different carrier frequencies F1, F2 are employed for the two signals as shown diagrammatically in Fig. 6, the receiving arrangement is modified as shown in Fig. 5: The receiver E has a wave band filter whose width comprises the two different carrier frequencies which are both amplified conjointly and are in a manner similar to the arrangement shown in Fig. 4 conveyed over a switching device to an indicating instrument. The receiver is also provided with a second band filter or with a simple resonance circuit 50. This band filter is merely tuned to the carrier frequency of one of the keying signals and is not influenced by the carrier frequency of the other signal. This carrier frequency after rectification and, if necessary, further amplification at 51 is used for actuating a switching device such as relay R, Fig. 4, and thus switching the contact T thereof.

The arrangement here before described by way of example is based on the assumption that the keying signals of the different kinds are of the same area as regards their graphical representation. If this condition is fulfilled each keying signal in the event of the two signals being of the same amplitude has the same virtual value, whereby the indicating instrument remains in its state of rest. This is the case of the continuous dash line. If however keying signals of unequal areas, such as dots and dashes, are used then in the event of the continuous dash line and in the case of the signals being of the same amplitude the virtual value of the signals of larger area is greater than the virtual value of the signals represented by smaller areas. As a result, although the course line is followed the pointer of the instrument will be in a position of constant deflection.

This drawback is in accordance with the invention avoided by employing an indicating instrument which is less sensitive to one current direction than it is to the other. In the case of an indicating instrument with tapped winding as shown in Fig. 4 this requirement may in a simple manner be fulfilled by tapping this winding not in the middle but in a point suitably spaced therefrom. The said disadvantage may be overcome also by connecting a resistance in parallel with one half of the instrument or by interposing such resistance in the respective current lead.

The switching means here employed may be electromechanic switches, such as electromagnetic relays or the like, as shown in Fig. 4. Instead of these, however, purely electric switching devices, controlled by the changing-over frequency, such as electronic or ionic tubes, may be used.

The arrangement here disclosed by way of example may be modified to suit the respective conditions and relationships. The keying signals and the synchronizing frequencies may be of any suitable kind. Also there are no rules as regards the mode in which the signal frequency and the synchronizing frequency are separated in the receiving arrangement and in which these frequencies are rendered effective. For instance, in lieu of filter chain S2 and relay R a frequency-sensitive relay may be employed. Equally, instrument J need not be of special construction. In fact, voltmeters or ammeters or still other direction-sensitive indicating means, such as electronic tubes, for example, may be used. The transmitting and receiving arrangement for use in connection with the novel method is likewise immaterial to the invention. For instance, the transmitter may be of the kind comprising alternately excited directive antennae or of the kind having a continually fed transmitting antenna and reflecting antennae adapted to be keyed.

What is claimed is:

1. A radio system comprising a radio transmitter for emitting radiation patterns alternately and in the rhythm of two kinds of signals produced by a keying operation, said two kinds of signals being adapted to complete each other to form a continuous signal, a source of synchronizing signals, means for coupling said source of synchronizing signals to said transmitter simultaneously with one of said two kinds of signal, a radio receiver for receiving said signals, an optical indicating device adapted to be actuated by said two kinds of signals of said received signals, switching means at said receiver operative at the rhythm of said keying operation to apply the two kinds of received signals in comparison fashion to said optical indicating device and a simple relay operated by said synchronizing signal for operating said switching means.

2. A radio system as defined in claim 1, wherein the optical indicating device is of the differential type for producing differential indications in accordance with one kind of signals being in preponderance of the other.

ERNST KRAMAR.